J. W. STAGG.
PORTABLE CAR UNLOADING CHUTE.
APPLICATION FILED MAR. 31, 1911.
1,028,831.
Patented June 4, 1912.
2 SHEETS—SHEET 1.
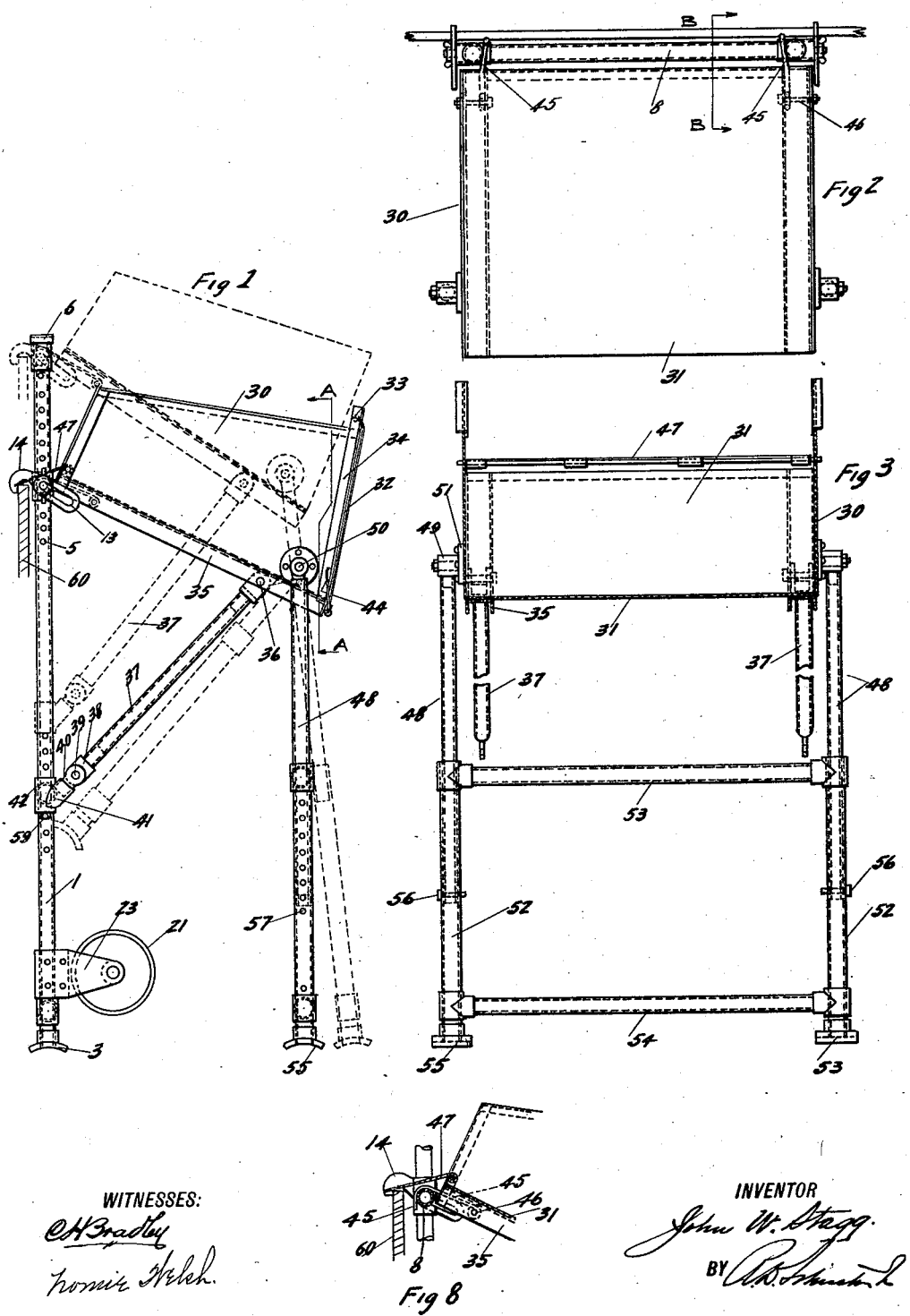

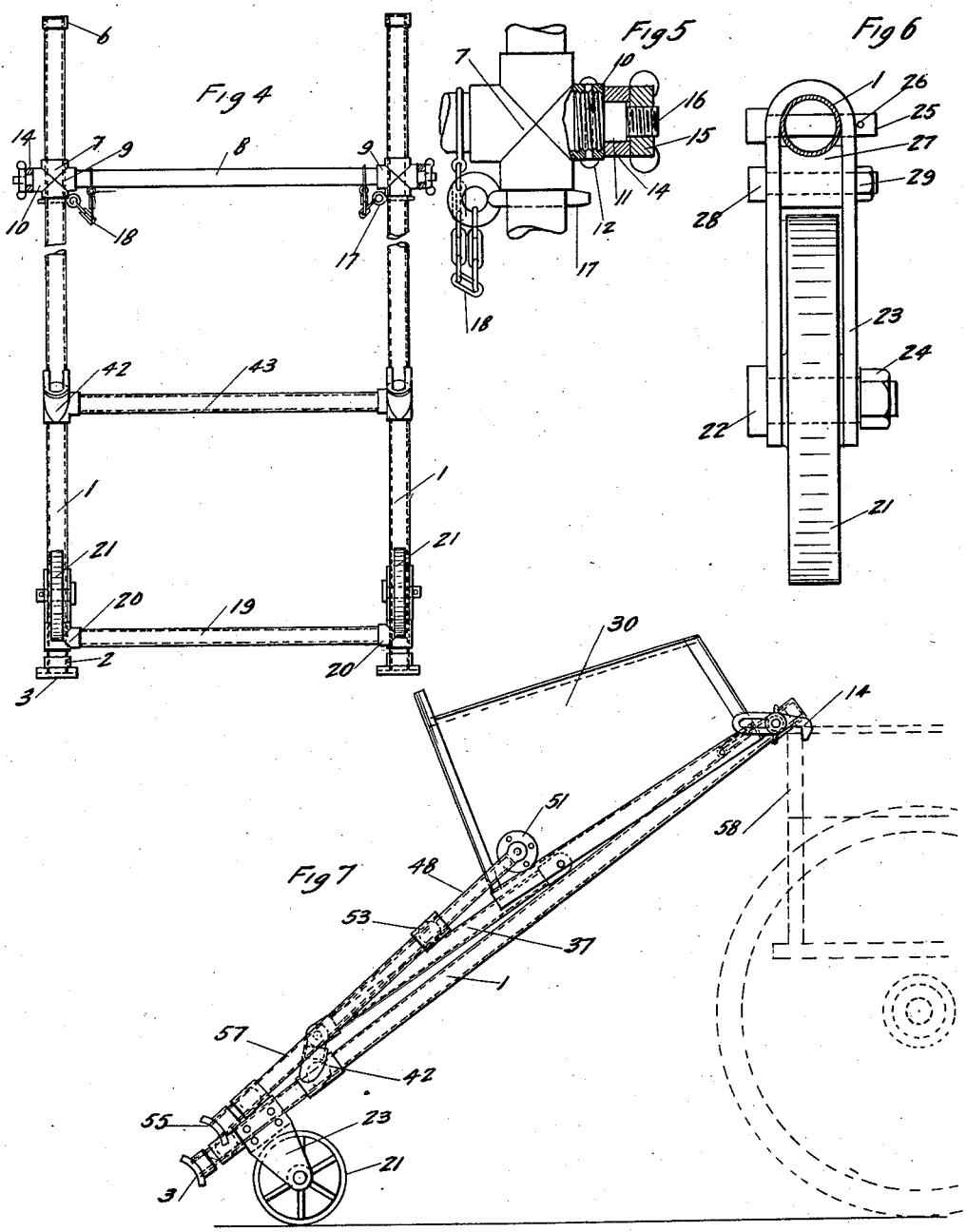

UNITED STATES PATENT OFFICE.

JOHN W. STAGG, OF ANNISTON, ALABAMA.

PORTABLE CAR-UNLOADING CHUTE.

1,028,831.

Specification of Letters Patent. Patented June 4, 1912.

Application filed March 31, 1911. Serial No. 618,260.

*To all whom it may concern:*

Be it known that I, JOHN W. STAGG, a citizen of the United States, residing at Anniston, in the county of Calhoun and State of Alabama, have invented certain new and useful Improvements in Portable Car-Unloading Chutes, of which the following is a specification.

My invention relates to an improvement in portable chutes particularly designed for attachment to railway cars or storage bins for bulk material to enable the material to be constantly shoveled or loaded into the chute and quickly dumped therefrom into the wagons or vehicles as they come to the car for loading, thereby preventing loss of time in the use of the wagons and teams and enabling the material to be unloaded quickly and at the minimum expense for labor and teams. These chutes are generally known as quick unloading portable chutes.

One object of my invention is to improve these chutes by providing novel supporting attachments which will enable the chute even while loaded to be cast off from the car that is being unloaded and to be supported in a position to clear the car and permit the shifting of same.

Heretofore, when it was desired to shift a car to which was attached a loaded chute, it was necessary either to unload the chute back into the car or dump its contents on the ground if no wagons were ready to receive same. I therefore claim as broadly new the idea of providing a portable unloading chute with means to support same independently of the car when necessary.

Another object of my invention is to facilitate the handling and transporting of these quick unloading chutes, making it possible for one man to move, adjust and attach even the largest chutes for holding as much as two cubic yards. To this end I mount the chute on wheels so arranged that it can be moved like a two wheel truck and yet the wheels are not in the way when the chute is in service.

A further object is to support the weight of the chute entirely on vertical supports which are adjustable for cars of different heights and to provide catch means for engaging the car and holding the chute in position alongside same, said catch means being readily disengaged from the car when it is desired to cast off the chute from the car.

A novel manner of attaching the chute to its ports permits the former to be adjusted to a proper height of the car or bin before it is raised on its supports to operating position, thus avoiding the trouble of adjusting the chute when elevated. The chute being detachably connected to its supports it will be possible to attach chutes of different size as occasion may require to the same truck support.

My invention further embodies many novel details of construction and arrangement of parts for the chute supporting frame work, all of which is illustrated in its preferred form in the accompanying drawings, which form a part of this specification, and in which:—

Figure 1 is a side elevation of the chute in position alongside the car with its supporting attachments in position to support the bin independently of the car. Fig. 2 is a top plan view of Fig. 1. Fig. 3 is a vertical sectional elevation along the line A—A of Fig. 1, the car supporting members not being shown. Fig. 4 is a front elevation of the car supporting members. Fig. 5 is an enlarged detail view of the adjustable means for supporting the cross piece to which the chute is hung. Fig. 6 is an enlarged detail view showing the manner of attaching the truck wheels to the chute supporting frame. Fig. 7 shows the chute frame collapsed and being moved as a truck. Fig. 8 is a detail sectional view taken along the line B—B of Fig. 2.

Similar reference numerals refer to similar parts throughout the drawings.

I have shown the supporting frame work for the chute formed of piping but obviously other forms of iron or steel frame work my be substituted within the scope of my invention. As illustrated, the main supporting frame comprises two upright standards 1 formed of piping, each having its bottom end threaded and screwed into the socket piece 2 of the wide concave foot pieces 3. Near an intermediate point, the standards are drilled to provide a series of holes and at their upper ends are similarly drilled to provide holes 5. The top of each standard 1 is covered by a cap piece 6 which is screwed over or otherwise attached to the same and forms a stop to prevent the slides 7, which support the adjustable cross piece 8, from slipping off the upper ends of the standards. The slides 7 are preferably formed of a fourway pipe coupling which is adapted to slip over and work freely up and down on the standards 1. The cross piece 8, which may be made of pipe also, is screwed or otherwise fastened in the ends 9 of the couplings and the opposite ends 10 of the couplings, as seen in Fig. 5, have a shouldered bolt 11 screwed thereinto and held against displacement by a transverse bolt or rivet 12 which passes through the end extension 10 and the enlarged threaded head of the bolt 11. The portion 11 of the bolt is rounded and serves as a bearing pin which passes through a slot 13 in the catch 14. A thumb screw 15 is screwed on to the outer threaded end 16 of each bolt and clamps the catch 14 in position relative to the standard. Pins 17 are adapted to be passed through the holes 5 and support the slide 7 in adjusted position, and to prevent loss of these pins they are connected to the cross piece 8 by chains 18. The standards 1 are braced at their bottom by a cross piece or pipe 19 which is connected to couplings 20 that surround and are suitably attached to the bottom portion of the standards adjacent to the foot pieces 3. Above the cross piece 19 I fasten the truck wheels 21 to the standards. These wheels are mounted on bearing pins 22 which pass through the ends of a U-shaped bent metal bar 23, one end of the pin having a head and the other end being threaded to receive a nut 24. The inner end of the U-bar 23 receives the standard 1, a pin 25 being passed through the bar and standard and locked against displacement by a cotter pin 26. In order to more firmly attach the U-bar to the standard I provide a metal block 27, the inner face of which is rounded to correspond to the standard. This block is interposed between the arms of the U-bar and is held firmly in place by the screw bolt 28 and nut 29. This arrangement of parts gives a strong rigid bearing which prevents the U-bar 23 from rattling or swinging about the standard.

The chute 30 has an inclined bottom 31 and an end door 32 which is hinged to a cross rod 33 mounted in the upper ends of the angle irons 34 which are attached to the outer ends of the side plates. Along the bottom at each side is a channel iron 35 to each of which is pivoted, by a pin 36, a brace arm 37, which is formed preferably of a pipe, the lower end of which receives a plug 38 having a flattened end which is pivotally connected by a pin 39 to a plate 40 which is adapted to seat itself and be supported in a socket 41 attached to a sleeve 42. One of these sleeves is slidably mounted on each standard 1 and they are each connected together by a cross rod or pipe 43. Catches 44 engage and hold the end door closed while the chute is being filled. I connect the chute to the cross member 8 by means of a pair of hooks 45 which are pivotally connected to bolts 46 which pass through the flanges of the channel irons 35 near the upper end of the chute. I also provide an apron 47 which is pivotally connected to the upper end of the chute and adapted to extend from a point at the upper end of the bottom over the cross bar 8 and the edge of the car or bin which is engaged by the hooks 14.

The supplemental supports which are brought into service when it is necessary to support the loaded chute in a position to clear the car, are shown ready to be put into service in Figs. 1 and 3, and comprise upper pipe sections 48 which have bearing pieces 49 connected to their upper ends and are mounted on journal pins 50 formed integral with a plate 51 attached to the sides of the chute near its discharge end. The lower ends of the pipe sections 48 telescope in pipes 52 forming the side members of the adjustable foot section, which side members at their top and bottom, respectively, are connected by cross bars or pipes 53 and 54, each pipe being fastened at each end to a suitable sleeve which is slipped over and suitably fastened to the pipes 52. At their lower ends the pipes are provided with foot pieces 55 similar to 3. Pins 56 are passed through one of a series of openings 57 formed in each pipe 52 and serve to adjustably support and lock the lower ends of the pipes 58, said pins being adjustably passed through alining openings in the pipes 52 and 48.

In operation, where it is desired to haul the portable chute to, or from, the point of service, if the truck wheels are in the position shown in Fig. 1, the cotter pins 26 are removed, the pins 25 withdrawn and the truck wheel supports swung around on the standards 1 until they occupy the position shown in Fig. 7, when the hook members 14 can be caught over the rear end of the dray or wagon 58 and hauled to or from the point of service. The pins 59, which hold the sleeves 42 in position on the standards being withdrawn so that the sleeves will slip down to the lowest position and permit the chute to drop down upon the standards 1, also the foot supporting frame comprising the pipes 48 and 57 will fold down and rest upon the main supporting frame. The truck wheels may be left in that position or if they would interfere with the car wheels they may be reversed to the position shown in Fig. 1, when the chute is ready for attachment to the car. To do this the standards 1 are moved into position alongside the car or bin 60, and the cross bar 8 is adjusted vertically until it will stand approximately on a level with the top of the car when the standards are raised. When the chute is positioned alongside the car the hooks are slid forward until they engage the edge of the car when the set screws 15 are screwed tightly against them to hold the main supporting frame in position alongside the car, when the chute can be adjusted at the desired angle, which is done by grasping the rod 43 and moving the sleeves 42 to the desired position and then inserting the retaining pins 59. The supplemental supports, consisting of the standards 48 and 57 will be normally collapsed as much as possible and may be swung inwardly and upwardly out of the way of the wagon, or may be swung up and over where they will rest on the side of the car on each side of the chute. When it is desired to bring the supplemental supports into service, they are swung down into the position shown in Fig. 1, the sections thereof are adjusted to bring the foot pieces 55 into position so that when the hooks 14 are released from the car the chute will swing outwardly a sufficient extent to clear the car and will be supported in that position by the main and supplemental frames until it can be reattached to the car when returned to position or until the chute can be dumped into a wagon. One great advantage of being able to support the chute clear of the railroad car is that the latter can, if desired, be moved along the track to bring the material therein to a point opposite the chute. This arrangement is broadly new and permits the chute when loaded to be supported free of the car when desired for any purpose. The supporting cross piece 8, to which the chute is attached and which carries with it the car engaging hooks 14, is adapted to be adjusted along the standards 1 to the height of the car, the full and dotted lines Fig. 1 showing the manner of adjusting the chute to cars at different heights. This prior adjustment before raising the chute avoids all difficulties of adjusting the chute while elevated, which are serious with heavy chutes of any large capacity. The apron 47 prevents the material which is being shoveled into the chute from falling down between the chute and the car. It will be noted that the chute stands always on a level with the edge of the car so that the material does not have to be lifted more than is necessary to clear the sides of the car. One of the greatest conveniences of the truck support of the chute is in moving the chute to positions along the car. To accomplish this the main supporting frame is swung outwardly at right angles to the car and then tilted till the weight of the chute rests on the truck wheels. This will enable the chute to be moved as a truck and readily adjusted in any position alongside the car or connected to a dray by the hooks 14 and hauled away, as seen in Fig. 7. When the chute has been loaded, its contents can be quickly dumped into a wagon which runs under the discharge end of the chute, this quick dumping of the variously loaded material in the chute enabling me to secure the maximum service out of the teams and hauling equipment.

As heretofore stated, I have shown the apparatus constructed from pipe as the latter is of standard material and which can be readily purchased for repairs and replacement, and without requiring any special material made. It will be obvious however that the frames and adjustable supports may be constructed of various other forms of metal bars and rods without departing from the spirit of my invention.

What I claim as new and desire to secure by Letters Patent, is:—

1. A quick unloading apparatus comprising a portable frame mounted on wheels and adapted to be tilted into vertical position alongside the receptacle for the material to be unloaded, a chute mounted on said frame and provided with side walls and a door at its discharge end, and means for attachment of the chute and its truck support to said receptacle for the material to be unloaded, said frame comprising supports which in operative position stand close to said receptacle and are adapted to support the discharge end of the chute in an overhung position free of other connections with its discharge end in position to deliver the contents of the chute into a wagon, substantially as described.

2. A quick unloading apparatus comprising a wheeled truck, a chute adjustably mounted on one end of the truck which is adapted to be tilted to stand on non-rotatable end supports and bring the chute into loading position, a door at the discharge end of the chute to store material therein, and means to hold the chute in position alongside the receptacle for the material to be unloaded, the truck means standing close to the receptacle and out of the way of wagons into which the chute discharges, substantially as described.

3. A portable apparatus of the character described, comprising a chute having side walls and an end door which controls the discharge of material from the chute, a main supporting frame for the chute consisting of two vertical standards that rest on the ground and are connected to the intake end of the chute, means to adjustably connect the discharge end of the chute to the frame which supports said discharge end free of the connections and in an overhung elevated position, and means to hold the frame with its overhanging chute alongside the receptacle for the material to be unloaded, substantially as described.

4. A portable apparatus of the character described, comprising a pair of leg supports adapted to rest upon the ground, vertically adjustable devices adapted to engage the receptacle from which the material is being unloaded and hold said legs in close vertical position alongside same, an unloading chute having a door controlling the discharge of material therefrom, means connecting said chute near its intake end to said legs, and means to give it vertical and angular adjustability thereon, said means being adapted to support the weight of the loaded chute with its discharge end standing free in an overhung position and being disposed so as not to interfere with wagons passing under the discharge end of the chute, substantially as described.

5. A portable apparatus of the character described, comprising a chute adapted to receive and hold material, a frame-work to support the main weight of the loaded chute which comprises vertically disposed legs which rest on the ground and are adapted to stand close to the receptacle that is being unloaded into the chute, means to adjustably brace and support the discharge end of the chute from said legs in an overhung position, said chute being adapted to fold down against said legs, and wheels connected to said legs so as to support same when lowered to a substantially horizontal position to provide for the transportation of the apparatus on wheels, substantially as described.

6. In an apparatus of the character described, a wheeled truck frame, a chute, means to adjust the point of connection of said chute to said frame, and means to engage the earth and support both truck and chute free of its wheel supports when the former is tilted into upright position alongside a receptacle to be unloaded, substantially as described.

7. In an apparatus of the character described, a frame, wheels connected near one end thereof, a chute connected near the other, said frame being adapted to rest on the ground and support the chute free of said wheels when the frame is moved to a vertical position alongside a receptacle for material to be unloaded, and means to engage said receptacle and hold said chute in position to be loaded thereon, substantially described.

8. A portable chute equipment for unloading cars into wagons comprising a chute having a door at its discharge end, a main support therefor adapted to be disposed vertically adjacent to the car to be unloaded, means to detachably connect said support to the car, and an auxiliary supporting means for the overhung discharge end of the chute which forms a part of the chute equipment and is normally swung out of the way of the wagons and is adapted to coöperate with said main support, when it is disconnected from the car, in supporting the loaded chute free of the car and in position to discharge its contents into wagons, substantially as described.

9. In a portable apparatus for unloading cars, the combination with a chute having a door at its discharge end to store material in the chute, legs adapted to be placed alongside the car which support the weight of the loaded chute from the ground, said chute being overhung so that wagons can drive into loading position under its discharge end, and means to detachably connect the chute to the car to counteract its overbalanced condition, of auxiliary means forming part of the portable apparatus and adapted to be brought into service when said detachable connections have been disconnected from the car to coöperate with said legs in supporting the chute in position to clear the car and discharge its contents into wagons, substantially as described.

10. A portable apparatus for unloading cars comprising vertically disposed supports having means to store material therein, and means to vertically and angularly adjustably connect said chute to said support so that its discharge end is disposed in an overhanging position to one side thereof and tends to unbalance its support, means to detachably engage the car and hold the vertically disposed member and the chute in position alongside same, and an auxiliary support connected to said apparatus and normally swung out of the way of wagons passing under the discharge end of the chute, said auxiliary support being adapted to engage the chute near its outer end and to coöperate with said support to sustain the loaded chute in elevated position to dump into wagons when the chute and its main supports have been swung outwardly to a position to clear the car, substantially as described.

11. A truck comprising wheel supports, a main frame and means to detachably support said frame in vertical position alongside of a car, a chute hinged to said frame at one end, an adjustable brace in said frame to support said chute in different angular positions, and an auxiliary support normally disposed so as not to interfere with wagons passing under the discharge end of the chute and which is adapted to be adjusted lengthwise and to coöperate with the main frame to support the chute when disconnected from the car and swung outwardly to clear the car, substantially as described.

12. In a portable apparatus of the character described, a frame comprising two cross connected uprights, a member slidably connected to said uprights so as to be vertically adjustable thereon, car engaging devices connected to said member, a chute hinged at its inner end to said adjustable member, braces for the outer end of the chute also adjustably connected to and supported by said uprights, and auxiliary longitudinally extensible supporting means connected to the outer end of the chute, substantially as described.

13. In a portable chute, the combination with the chute, of a pair of legs to support same from the ground, truck wheels connected to said legs and disposed off the ground when the chute is in operating position, and means to adjust said truck wheels about said legs, substantially as and for the purposes described.

14. In a portable chute of the character described, a main supporting means comprising a pair of cross braced legs having feet at one end, on which the legs rest when in vertical position, a cross bar vertically adjustable on said legs, an inclined chute having a door at its discharge end, means to pivotally connect the intake end of said chute to said cross bar, hook members carried by said bar and adapted to engage the receptacle from which the material is loaded into the chute, slides adjustable on said legs and braces pivoted to the slides and to the discharge end of the chute, and auxiliary legs connected to the side walls of the chute and out of alinement with the braces, said auxiliary legs being adjustable as to length and adapted to swing inwardly against said vertically disposed legs so as to leave the discharge end of the chute standing in an overhung position so that wagons may be moved under it, substantially as described.

15. In a portable chute of the character described, the combination of an inclined chute with a door at its discharge end to make a storage receptacle of it, vertical supports for the inner end of the chute which rest on the ground and stand alongside the car to be unloaded, and means to detachably connect said supports to said car, of auxiliary supports adapted to be used only when the chute is disconnected from the car which are pivotally connected to the outer overhung end of the chute and adapted to be swung inwardly and out of the way when the chute is connected to a car, substantially as described.

16. In a portable chute of the character described, a vertical frame, a cross member adjustably connected to said frame, means to hold said member in adjusted positions, a chute hinged to said adjustable cross member, a brace means for the chute comprising two inclined members connected to the chute and to a cross member also adjustably connected to said frame, means to hold said latter cross member in adjusted positions on the uprights, an auxiliary support connected to the outer end of the chute and comprising two telescoping sections, and means to adjustably connect same together, both supporting members having extended foot pieces at their lower ends, substantially as described.

In testimony whereof I hereto affix my signature in presence of two witnesses.

JOHN W. STAGG.

Witnesses:
R. D. JOHNSTON, Jr.,
NOMIE WELSH.

---

Copies of this patent may be obtained for five cents each, by addressing the "Commissioner of Patents, Washington, D. C."